(12) United States Patent
Beisner et al.

(10) Patent No.: US 6,324,474 B1
(45) Date of Patent: Nov. 27, 2001

(54) METHOD FOR ESTABLISHING COVERAGE AREA AND ACCURACY OF A WIDE-AREA DIFFERENTIAL GLOBAL POSITIONING SYSTEM

(75) Inventors: Henry M. Beisner, Rockville; Arthur J. Dorsey, Gaithersburg, both of MD (US); Timothy C. Parker, Vienna, VA (US)

(73) Assignee: Lockhead Martin Corporation, Gaithersburg, MD (US)

( * ) Notice: Subject to any disclaimer, the term of this patent is extended or adjusted under 35 U.S.C. 154(b) by 0 days.

(21) Appl. No.: 09/258,204

(22) Filed: Feb. 26, 1999

Related U.S. Application Data
(60) Provisional application No. 60/076,285, filed on Feb. 27, 1998.

(51) Int. Cl.[7] .................................................. G06F 165/00
(52) U.S. Cl. .......................... 701/215; 701/207; 701/213; 701/214; 701/226; 342/357.01; 342/357.06; 342/357.08
(58) Field of Search .................................... 701/200, 207, 701/213, 214, 215, 226; 455/3.2, 12.1, 13.1, 13.2, 456; 342/357.01, 357.03, 357.06, 357.07, 357.08

(56) References Cited

U.S. PATENT DOCUMENTS

| | | | |
|---|---|---|---|
| 4,578,678 | 3/1986 | Hurd | 342/357.12 |
| 4,928,107 | 5/1990 | Kuroda et al. | 342/357.15 |
| 5,153,599 | 10/1992 | Harigae et al. | 342/352 |
| 5,323,322 | 6/1994 | Mueller et al. | 701/215 |
| 5,347,286 | 9/1994 | Babitch | 342/359 |
| 5,390,124 | 2/1995 | Kyrtsos | 701/215 |
| 5,436,632 | 7/1995 | Sheynblat | 342/357.03 |
| 5,731,788 | * 3/1998 | Reeds | 342/357.07 |
| 5,973,639 | * 10/1999 | Biacs et al. | 342/357.03 |
| 6,049,303 | * 4/2000 | Biacs et al. | 342/357.03 |

OTHER PUBLICATIONS

Dennis L. Shaver et al. "Satellite–Based Air Traffic Management Accuracy Performance Model (SAPM) A Useful Tool for Predicting GNSS Augmentation System Performance", ATC Systems, Jul./Aug. 1995, pp. 29–32.

* cited by examiner

*Primary Examiner*—William A. Cuchlinski, Jr.
*Assistant Examiner*—Gertrude Arthur
(74) *Attorney, Agent, or Firm*—Andrew C. Aitken; Venable, Baetjer, Howard & Civiletti LLP

(57) ABSTRACT

A method for measuring the effectiveness of a wide-area differential global positioning system by projecting the least-squares error covariance of the space vehicles and ground reference stations through the central control station. Through generation of the differential corrections at the central control station, the space vehicle-ground reference station error covariance is then projected onto the wide-area differential global positioning system user locations. A covariance analysis approach is then used to capture the dependencies of the space vehicle and observability of the space vehicle by the ground reference stations and to the user locations within the wide-area differential global positioning system coverage area.

4 Claims, 3 Drawing Sheets

METHOD FOR ESTABLISHING COVERAGE AREA AND ACCURACY OF A WIDE-AREA DIFFERENTIAL GLOBAL POSITIONING SYSTEM

This application claims the benefit of the prior provisional application, Serial No. 60/076,285, filed Feb. 27, 1998.

BACKGROUND OF THE INVENTION

1. Field of the Invention

The invention relates to an improved method for establishing the coverage area of a Wide-Area Differential Global Positioning System (WADGPS), and specifically to predict the level of accuracy when navigating within a coverage area to transmit information and determine a user's position.

2. Description of the PriorArt

WADGPS have been developed for a multiple of applications, including aircraft navigation. Such systems use a combination of the U.S. Department of Defense Global Positioning System (GPS) Space Vehicles (SV), a network of Ground Reference Stations (GRS), a Central Control Station (CCS), and differential corrections continuously broadcast from either a ground or a space based reference point. A ground transmitter may be placed at a fixed geographic location, while a space based transponder may be placed aboard a geosynchronous earth orbiting SV (GEO SV). The CCS generates the differential corrections using the GRS observable measurements and the differential correction transmitter continuously broadcasts the WADGPS information to users within the wide area. One such system being developed ior the U.S. Federal Aviation Administration is the Wide-Area Augmentation System (WAAS), as described in specification FAA-E-2892.

Various methods have been proposed in the prior art to assess the effectiveness of such GPS augmentation systems. The standard GPS coverage models quantify accuracy and availability in terms of Dilution of Precision. While generally effective, these prior art methods do not capture the spatial and temporal dynamics of a WADGPS system. The additional GRSs within a WADGPS enables the space vehicle Signal-in-Space (SIS) errors to be decomposed into their ephemeris and clock components. The present invention utilizes such a decomposition to more closely approximate the SV SIS accuracy and project these error sources onto a lattice of user locations to predict WADGPS navigation accuracy. The inventive method allows prediction of the effective user position accuracy over a wide geographical area. This will determine the operational characteristics of an existing WADGPS system or optimize a proposed WADGPS system configuration.

Two alternatives exist to evaluate user position determination accuracy in a WADGPS. The first alternative involves the use of a discrete simulation of the WADGPS network and the evaluation of the various performance metrics by enumeration. However, such a discrete simulation requires a precise definition of the network and numerous Monte Carlo scenarios to generate meaningful statistics. A second alternative is the use of an analytical model that captures the underlying physics and dynamics of the WADGPS configuration. The present invention uses such analytical models to predict the WADGPS navigation accuracy and its effective coverage area.

SUMMARY OF THE INVENTION

It is therefore an object of the present invention to provide a method to predict the effectiveness over a wide-area of a differentially corrected space vehicle based navigation service such as the U.S. FAA WAAS. This will incorporate the spatial and temporal variations of the constellation of space vehicles when observed by the network of WADGPS ground reference stations.

A second object of the present invention is to provide a method for predicting the accuracy of the users navigation position determination.

Briefly, this invention describes a method for measuring the effectiveness of a WADGPS by projecting the least-squares error covariance of the SVs and GRSs through the central control station. Through generation of the differential corrections at the CCS, the SV-GRS error covariance is then projected onto the WADGPS user locations. A covariance analysis approach is then used to capture the dependencies of the SV and the observability of the SV to the GRSs and to the user locations within the WADGPS coverage area.

The SIS least-squares error covariance captures the SV ephemeris short-term and long-term errors, the SV clock short-term errors, the GRS clock and receiver errors, and the Selective Availability short-term clock dither prediction error. A key component of the error covariance approach is the ability to capture the spatial and temporal variations of the GPS constellation relative to the GRS locations. The GRS is a critical factor in the WADGPS SIS accuracy. Their placement depends on amount of GRSs, GRS construction cost, GRS to CCS communication availability, and GRS maintenance convenience. This invention quantifies the impact of the GRS quantity and their geographic placement on overall WADGPS SIS accuracy.

The user positional accuracy is predicted following a multi-step process that projects the SIS error covariance onto a lattice of potential user locations. During this process, additional error sources such as user receiver and residual ionospheric errors are induced. At each potential user location, a subset of the best SVs are selected. Best in this sense is defined in the art as those SVs for which the users position determination will be minimally impacted. This is commonly known in the art as minimum position dilution of precision (PDOP). A typical avionics user receiver has limited SV tracking capacity and would select only the best-of-six SVs for the purpose of determining a navigation fix. In all cases though, the WADGPS user must receive the differential corrections continuously broadcast by the WADGPS. Thus the user must always have in view either a GEO SV or a ground based transmitter. In WAAS, a geostationary (GEO) satellite continuously transmits the differential corrections. An important factor in the user avionics receiver SV selection process is the minimum antenna elevation mask angle. This elevation angle acts as a constraint on the number of SVs visible to the user. The invention considers the user and the GRS mask angles to be different. A lower user mask angle may significantly increase the WADGPS coverage area, however, the airframe will likely induce larger multipath effects at low elevation angles. A lower GRS angle significantly increases the duration of the GRS-SV observables, but the slant range will likely induce larger delay effects at low elevation angles.

The SIS error covariance of the selected SVs is projected along the line-of-sight vector to the user location. In summary, our method is comprised of the following steps:

Generation of a lattice of user location points that converts from geodetic latitude and longitude coordinates to earth-centered, earth-fixed coordinates.

Initialization of a common epoch time and duration based on the available trajectory data.

At each time step:
  Propagation of the GPS and GEO SV position.
  Generation of the SIS least-squares error covariance using the available GRSs and the SVs visible to those GRSs.
  Generation of the user navigation positional accuracy for each lattice point using the projected SIS error covariance.
  Evaluation of WADGPS-specified performance metrics for each lattice point.

BRIEF DESCRIPTION OF THE DRAWINGS

The foregoing and other objects, purposes and advantages will be better understood from the following detailed description of a preferred embodiment of the invention with reference to the drawings, in which.

DETAILED DESCRIPTION OF A PREFERRED EMBODIMENT OF THE INVENTION

As will be appreciated by those skilled in the art, a Wide-Area Differential Global Positioning System is comprised of a space segment, a control segment, and a user segment. The space segment provides a highly stable time-based spread-spectrum signal, with navigation, integrity and ionospheric delay data to the user. The control segment tracks the space vehicles to determine their ephemerides and atomic frequency standard (clock) errors. The control segment provides navigation data for each observable SV to the user segment. The navigation data includes ephemeris and clock differential corrections to estimate radio frequency signal propagation delay due to free space and ionosphere effects. The data also determines SV integrity and the calculation of the orbits of SVs that are observable to the user segment. The user segment demodulates and computes the user location, based on the navigation, integrity, and ionospheric delay data provided by the control segment.

Figure 1:
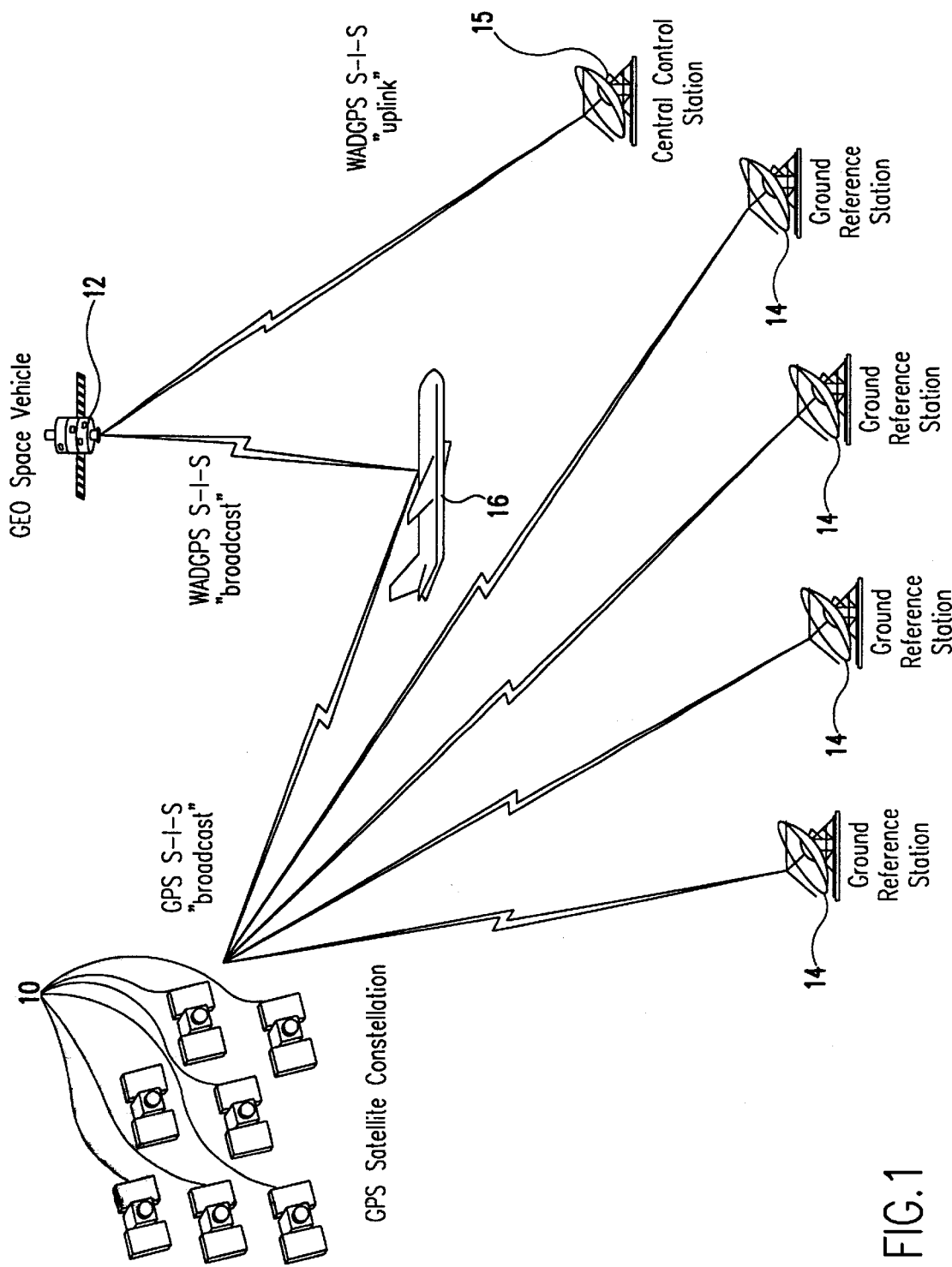
FIG. 1 is a simplified pictorial view of the components of a typical WADGPS known in the art and to which the teachings of this invention are applicable.

As illustrated in FIG. 1, a typical WADGPS has a number of earth orbiting (i.e., Global Positioning System) space vehicles (GPS SV) 10, geosynchronous earth orbiting space vehicles (GEO SV) 12, and multiple fixed Ground Reference Stations (GRSs) 14 located at various points on the Earth This includes at least one Central Control Station 15 with a capability to "up-link" the differential correction to the GEO SV for subsequent broadcast over a wide area of coverage. A user 16, such as an aircraft, solves for a three-dimensional navigation fix by using measurements from at least four SVs (including at least one GEO SV that is broadcasting the correction data from the control segment to the user). Four SVs are required because precise WADGPS Network Time (WNT) is assumed to be unknown to the user. The measurements obtained by the user, referred to as pseudoranges, represent the slant range between the user and the SV, plus propagation delays and times biases. From the $i^{th}$ SV to the $n^{th}$ user, pseudorange is given by:

$$PR_{i,n} = R_{i,n} + c(t_n - t_i) + \Delta Tropo_{i,n} + \Delta Iono_{i,n} + SA + \sigma_n \quad (1)$$

where: $R_{i,n}$ is the slant range, $\tau_n$ and $\tau_i$ are the time offsets between the $n^{th}$ user and the $i^{th}$ SV clock value, respective relative to WNT, $\Delta Tropo_{i,n}$ and $\Delta Iono_{i,n}$ are the tropospheric and ionospheric propagation delays, respectively, SA is the selective availability corruption, $\tau_n$ is the receiver measurement error, and c is the speed of light (equals $2.99792458 \times 10^8$ meters/second). A navigation fix, $(X_n, Y_n, Z_n)$, and time offset, $\tau_n$ is obtained by the $n^{th}$ user when solving the following set of equations:

$$\Delta PR_{i,n} = \sqrt{(X_i - X_n)^2 + (Y_i - Y_n)^2 + (Z_i - Z_n)^2} + c(\tau_n - \tau_i) \text{ for } i=1,2,3 \quad (2)$$

where $\Delta PR_{i,n}$ is the pseudorange residual, corrected for ionospheric and tropospheric effects, and $(X_i, Y_i, Z_i)$ is the $i^{th}$ SV position, as computed from the navigation data provided.

The solution of the user position in equations (1) and (2) requires a common coordinate system for the SV and user, a model for the SV trajectory and its propagation; a model for SV SIS navigation and ionospheric accuracy; and a model of the user positional accuracy. Because of the spatial and temporal variation of user accuracy across the coverage area (due to SV visibility), the WADGPS performance metrics must be evaluated at numerous time points and numerous user locations. All calculations use a common coordinate system as specified in the GPS Standard Positioning Service Signal Specification; specifically the World Geological Survey of 1984, WGS-84. During the analytical model initialization, all Ground Reference Station and user locations are converted from WGS-84 geodetic latitude, longitude, and height to earth-centered, earth-fixed coordinates.

Figure 2:
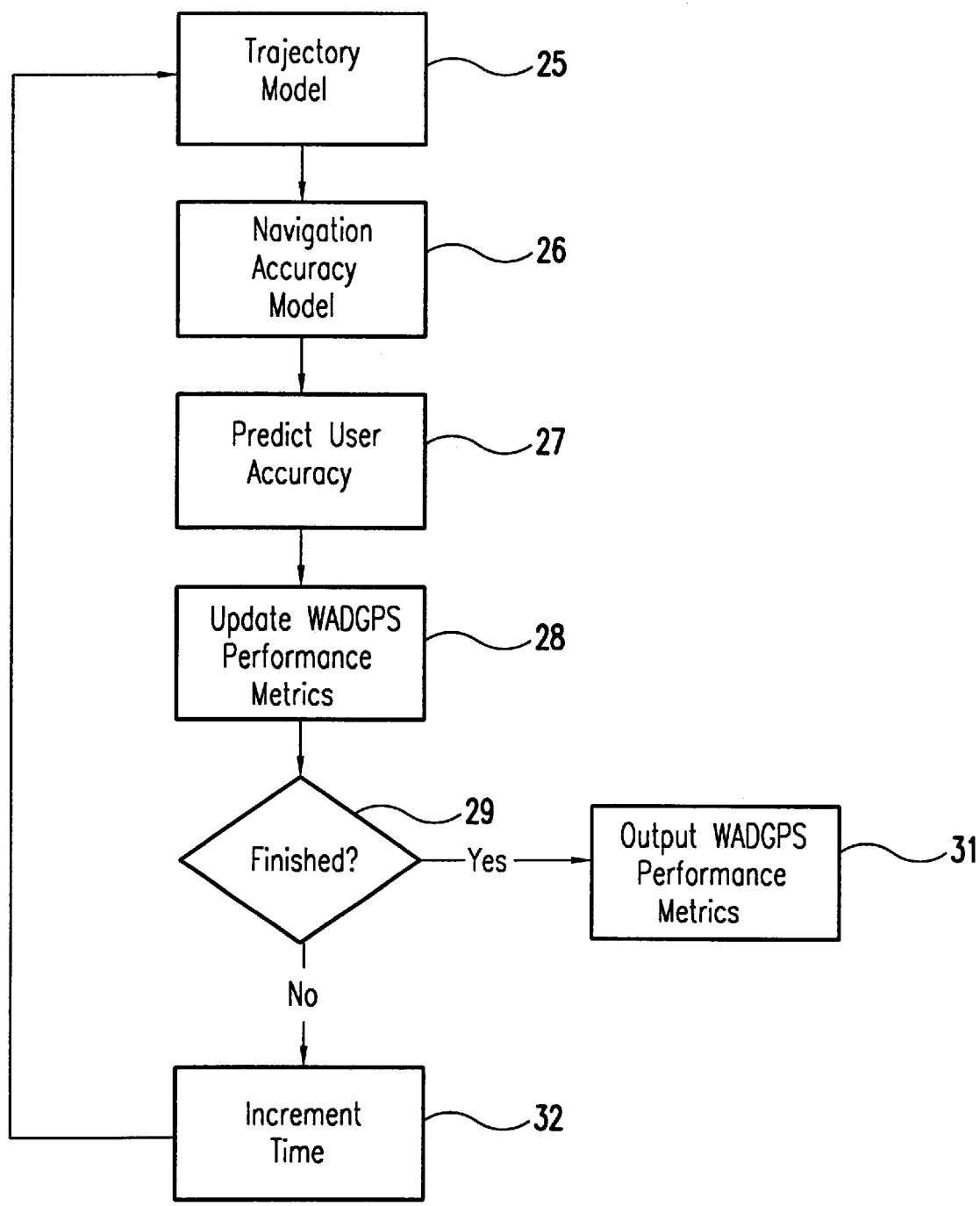
FIG. 2 is a block diagram of the invention.

Referring now to FIG. 2, the method of the invention starts at function step 25, building a trajectory model for the space vehicles 10 and 12. The trajectory model is generated following accepted prior art methods for determining the WGS-84 earth-centered, earth-fixed SV locations as a function of time. This generation process starts with state data comprised of the GPS-provided almanac data which is used to propagate Keplerian-like, orbital parameter data for the SVs. This orbital parameter data is converted to WGS-84 earth-centered, earth-fixed coordinates from which the space vehicle position data is determined. Parameters input to this function include GPS orbits, GPS ephemeris accuracy, GPS clock stability, SA dither inducted errors, GEO clock stability, GEO orbits, and GEO ephemeris accuracy.

Function step 26 builds a navigational accuracy model of the WADGPS. The determination of navigational accuracy (step 26), in accordance with the teachings of this invention is based in part upon a determination of the GRSs to observe particular SVs. Unless an SV can be observed by a minimum number of GRSs necessary to decompose ephemeris and clock error components, it is declared unavailable for subsequent processing at this time step. The navigational accuracy accounts for the Ground Reference Station receiver accuracy, and the Selective Availability clock dither prediction accuracy. Parameters input to this function include: the GRS location, the GRS minimum antenna mask angle, the GRS receiver noise, and the GRS clock stability.

In function step 27, the predicted SV ephemeris and clock accuracy from the navigational accuracy model are projected onto the user locations, and are combined with user receiver errors and residual ionospheric errors to determine predicted user location accuracy. Each determination of predicted user location accuracy over a given time is used to update the WADGPS performance metrics at function step 28. The WADGPS-specific performance metrics are evaluated for each increasing time period (steps 29 and 32) until the coverage area (i.e., lattice of potential user locations) for all time periods has been evaluated. At the completion of this processing, the WADGPS performance metrics are outputted and stored, step 31.

Figure 3:
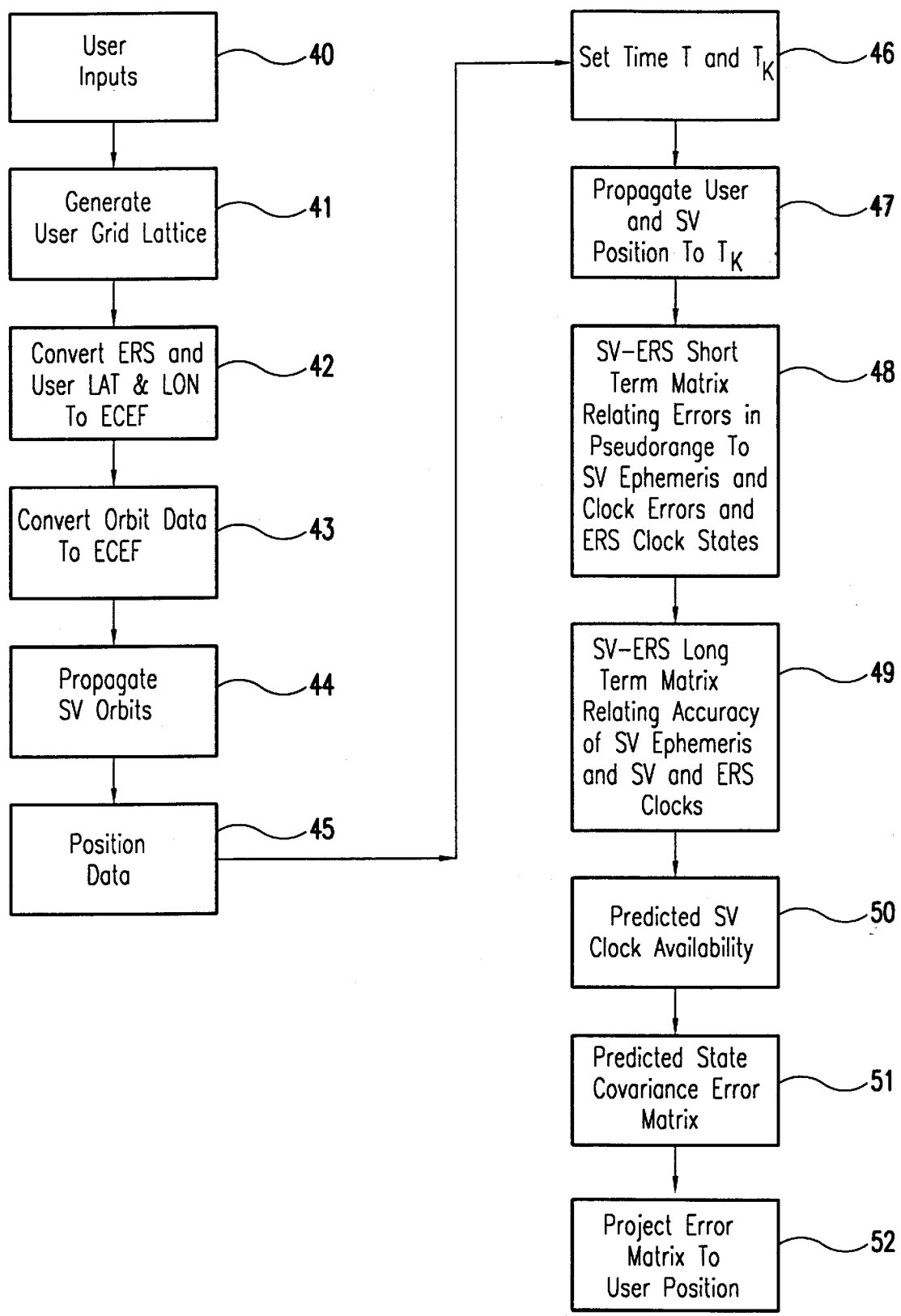
FIG. 3 is a flow diagram of the steps of a WADGPS evaluation method of FIG. 2.

Referring now to FIG. 3, the process steps associated with the functions described in FIG. 2 are explained in more detail.

A user specified, step 40, lattice of potential user locations (i.e., latitude, longitude and height) is generated, step 41, the lattice and the latitude and longitude of the GRSs are converted to the ECEF coordinates, step 42, and stored in a database, step 45. The SV orbits are propagated, step 44 to a time point of interest, converted to the ECEF coordinates, step 43, and stored in database, step 45.

The process starts, step 46, at a time T and for each iteration of the process until complete. The time T is incremented and user and SV positions are propagated to the new time $T_k$. step 47.

As indicated, the navigational accuracy, step 48, model uses short-term interval estimates of the SV position and clock, the GRS clock, and the SV-GRS pseudoranges over the time step (e.g. nominally five minutes). The short-term component is constructed from a weighted least-squares error covariance derived from all SV-GRS pseudorange pairs whose SV elevation with respect to GRS exceeds a minimum antenna elevation mask angle, step 40, for the given time step, step 46.

The least-squares estimator consists of three positional components for each SV, and a dock bias for each SV and GRSs, of the form:

$$[X_i, Y_i, Z_i, \tau_{sv,i}, \tau_{GRS,j}] \quad (3)$$

Where: $(X_i, Y_i, Z_i)$ is the $i^{th}$ SV position and $\tau_{sv,i}$ and $\tau_{GRSj}$ are the $i^{th}$ SV and the $j^{th}$ GRS time offsets, respectively, relative to WNT. The SV-GRS pseudorange measurement is of the form:

$$PR_{i,j} = \|r_{sv,i} - r_{wrs,j}\| + c(\tau_{GRS,j} - \tau_{sv,i}) + \Delta Tropo_{i,j} + \Delta Iono_{i,j} + SA + \sigma_n$$

Where: $r_{sv}(t_k)$ and $r_{GRS}$ are the SV and GRS ECEF position vectors, respectively, $\Delta Tropo_{i,j}$ and $\Delta Iono_{i,j}$ are the tropospheric and ionospheric propagation delays, respectively, SA is the selective availability corruption, $\sigma_n$ is the receiver measurement error and c is the speed of light (equals $2.99792458 \times 10^8$ meters/seconds).

The partial derivatives of the pseudorange, with respect to the least-squares estimator (3), is of the form:

$$A = \frac{\partial PR}{\partial (t_{wrs}, r_{sv}^T, t_{sv})} = [1, u_{sv,wrs}^T, -1]$$

where $$u_{sv,wrs} = \frac{r_{sv}(t_k) - r_{GRS}}{\|r_{sv}(t_k) - r_{GRS}\|}$$

The short-term information matrix, $S_S$ is generated by collecting all SV-GRS pseudorange partials over the update interval as follows:

$$S_S = A^T \cdot W \cdot A \quad (4)$$

Where W is a weighting matrix that depends on GRS receiver accuracy, $\sigma_{GRS}$.

A noteworthy parameter in the generation of the least-squares SIS error covariance is the number of GRSs observing each SV. This parameter, $N_{GRS}$, nominally set to five: four GRSs are necessary to accurately decompose the SV ephemeris and clock error components and a fifth GRS to detect SV abnormalities (i.e. integrity monitoring). The ability to show performance in terms of $N_{GRS}$=4, 5, and 6 is of interest in terms of minimal operation, fault detection and fault isolation, i.e. which component of the SV is out of bounds.

A second parameter of significant is the GRS minimum antenna elevation mask angle. Site-specific conditions and antenna complexity of the GRSs will dictate acceptable minimum antenna elevation mask angles to achieve overall WADGPS accuracy. Nearby interference sources at certain locations may dictate greater mask angles.

To capture the geometric dependencies of integrity monitoring, the process requires that at the completion of the SV-GRS pseudorange data collection (4), a particular SV must be observed by a user specified, step 40, minimum number of multiple GRSs, $N_{GRS}$, in order to be included in subsequent processing. The intent of this constraint is to insure that the SV ephemeris and clock error components can be decomposed and to have sufficient GRS coverage to correctly identify an SV abnormality.

Long-term components, step 49, account for the longer time constant components of the SV ephemeris and clock, and the long-term GRS clock components. The long-term ephemeris and clock errors are derived from a reference trajectory orbital fit of the WADGPS pseudoranges, nominally updates every hour. The long-term ephemeris and clock errors depend on the number of solved-for SV and GRS, the SV dock noise, the GRS receiver noise, and selective availability dither corruption (each of which is user specified in step 40).

At step 50, the predictive component accounts for the GPS SV clock dither corruption over the predictive upload interval (nominally every five seconds). Prediction error results from the propagation of the smoothed estimates over the duration of the prediction interval. Prediction errors include reference ephemeris force model errors, clock modeling errors, and modeling errors due to nonlinearities when the current estimates lie outside the linearization region. For the nominal 10-second prediction interval, the reference trajectory and nonlinear modeling errors are assumed to be small, and are not treated in the error covariance prediction. However, the GPS SV clock modeling errors due to SA over the prediction interval are significant. These are accounted for explicitly in the error covariance prediction.

The predicted user accuracy is determined by incorporating a predicted error covariance C, step 51, comprised of the SV ephemeris and clock accuracy, residual ionospheric errors and user receiver accuracy from step 51. These are projected onto the matrix to the user location, step 52. The user inputs include:

| Input Parameter | Description | Units |
|---|---|---|
| C | Predicted State Covariance at time $t_k$ | meters$^2$ |
| User | User Receiver accuracy (1) | Meters |
| UIVE | SV ionospheric residual correction accuracy (1) | Meters |
| sv($t_k$) | SV ECEF position vector at time $t_k$ | Meters |
| U | User ECEF position vector | Meters |
| Euser$_1$m | Minimum User Elevation Mask Angle | Radians |

Specifically, the predicted error covariance, C, is transformed into pseudorange uncertainty for a given user location, as follows:

$$R = B \cdot C \cdot B^T$$

where

-continued $$B = \frac{\partial PR}{\partial (r_{sv,1}^T, \tau_{u,1}, r_{sv,2}^T, \tau_{u,2}, \ldots, r_{sv,6}^T, \tau_{u,6})}$$

Then the pseudorange uncertainty, R, is projected onto the user location, as follows:

$$C_w = KRK^T \quad (5)$$

using the user position K-matrix. The predicted user position covariance, $C_w$, is supplemented with the user avionics receiver accuracy, $\sigma_{user}$, to compute the total predicted user position covariance, $C_u$, as follows:

$$C_u = \sigma^2 user \cdot [K \cdot K^T] + C_w \quad (6)$$

The K-matrix, in (5) and (6), selects "the best of six" SVs having the minimum PDOP. The vertical ionospheric delay for the $n^{th}$ user location is computed by projecting the residual ionospheric delay, UIVE, onto the user location as follows:

$$UIVE_n = \sum_{i=1}^{N_{visb}} SF_{i,n} \left[\frac{UIVE}{3.27}\right] |K_{i,3}|$$

where $$SF_{i,n} = \frac{1}{\sqrt{1 - \left[\frac{r_e \cos(E_{i,n})}{r_e + h_m}\right]^2}}$$

and $E_{i,n}$ is the elevation of the $i^{th}$ SV with respect to the $n^{th}$ user, $r_e$ is the radius of the earth (6378.137 for WGS-84) and $h_m$ is the height of the maximum electron density (assumed to be equal to 350 km).

To predict the SIS navigation accuracy available at each potential user location throughout the WADGPS coverage area the various FAA WAAS performance metrics are calculated. These include User Differential Range Error, Horizontal Position Accuracy, Vertical Position Accuracy, User ionospheric Error, and Vertical Position Error. At step 52, the results of the user navigation position solution for all space and time points are tabulated and presented following the process of projecting the SIS error covariance onto the lattice of potential user locations:

User Differential Range Error (UDRE)

The UDRE, as defined in [FAA-E-2892], bounds the 99.9th percentile value of the distribution of residual pseudorange error at a specific location. This quantity is similar to the metric in the GPS SPS, known as User Range Error (URE). URE, in one classical definition, relates the ratio of the RMS navigational position error, $\sigma_{nav,p}$, to the Position Dilution of Precision (PDOP) as follows:

$$\sigma_{URE} = \frac{\sigma_{nav,p}}{PDOP} \quad (7)$$

where the navigational positional error, $\sigma_{nav,p}$ can be decomposed in Cartesian components, ($\sigma_{nav,x}$, $\sigma_{nav,y}$, $\sigma_{nav,z}$), or correspondingly its horizontal and vertical components, ($\sigma_{nav,x}$, $\sigma_{nav,z}$), as follows:

$$\sigma_{nav,p} = \sqrt{\sigma^2_{nav,x} + \sigma^2_{nav,y} + \sigma^2_{nav,z}} = \sqrt{\sigma^2_{nav,h} + \sigma^2_{nav,v}}$$

and PDOP is defined as:

$$PDOP = \sqrt{\sum_{m=1}^{3} \left[\sum_{i=1}^{N_{visb}} K_{m,i}^2\right]}$$

Similar definitions exist for horizontal and vertical navigational position errors, ($\sigma_{nav,h}$, $\sigma_{nav,v}$) in terms of the Horizontal and Vertical Dilutions of Precision, HDOP and VDOP, respectively, as follows:

$$\sigma_{nav,h} = HDOP \cdot \sigma_{URE} \quad (8)$$

$$\sigma_{nav,v} = HDOP \cdot \sigma_{URE} \quad (9)$$

The URE, as defined in equations (7)–(9), is an aggregate across user locations and satellites. It is well established that the relationship between the pseudorange error, $\sigma_{URE}$, and the navigation position error, $\sigma_{nav,p}$, is nonlinear. In order to accurately assess system performance, the specific characteristics of PDOP, HDOP, and VDOP need to be evaluated at various sites. URE is commonly accepted to be Gaussian, and its k-th percentile value is obtained by a scaling of its $1\sigma$ value; e.g. the 99.9th percentile is obtained by scaling $\sigma_{URE}$ by 3.27.

With this background, the UDRE is defined as follows:

$$UDRE = 3.27 \cdot \sigma_{UDRE} \quad (10)$$

where $$\sigma_{UDRE} = \frac{\sigma_{nav,wp}}{PDOP} \quad (11)$$

The user navigational positional error, $\sigma_{nav,wp}$ can be decomposed in Cartesian components, ($\sigma_{nav,wx}$, $\sigma_{nav,wy}$, $\sigma_{nav,wz}$) in the same manner as above, or correspondingly its horizontal and vertical components, ($\sigma_{nav,wh}$, $\sigma_{nav,wv}$), as follows:

$$\sigma_{nav,wp} = \sqrt{\sigma^2_{nav,wx} + \sigma^2_{nav,wy} + \sigma^2_{nav,wz}} = \sqrt{\sigma^2_{nav,wh} + \sigma^2_{nav,wv}}$$

The navigational positional error, $\sigma_{nav,wp}$, is related to the predicted user position covariance, $C_w$, in (5) as follows:

$$\sigma_{nav,wp} = \sqrt{\sum_{m=1}^{3} C_w(m,m)} \quad (12)$$

The ($1\sigma$) residual pseudorange error, $\sigma_{UDRE}$, is of the form:

$$\sigma_{UDRE,n}(t_k) = \frac{\sqrt{\sum_{m=1}^{3} C_w(m,m)}}{\sqrt{\sum_{m=1}^{3} \left[\sum_{i=1}^{N_{visb}} K_{m,i}^2\right]}} \quad (13)$$

where the explicit dependency on the $n^{th}$ user location and time point, $t_k$, is shown.

User Ionospheric Vertical Error (UIVE)

The UIVE, as defined in [FAA-E-2892], bounds the 99.9th percentile of the distribution of residual error of the user-interpolated vertical ionospheric delay from a satellite. UIVE is an input to the coverage model that depends on the number of GRSs in the coverage volume. The residual ionospheric error is assumed to be homogenous across the coverage volume media with no interpolation errors.

In this treatment, the UIVE is converted to a one-sigma (1σ) value, assuming Gaussian statistics, and projected onto the user location, via the K-matrix, to evaluate the various performance metrics.

Vertical Position Error (VPE)

The vertical position error, as defined in [FAA-E-2892], is the 99.9th percentile of the distribution of the vertical position residual error (dependent on the magnitude of the VDOP) having the form:

$$VPE_n = \sqrt{\sum_{i=1}^{N_{visb}}[K_{3,i}^2][UDRE_i + 3.27\,\sigma_{user}^2]\,+} \quad (14)$$

$$\sum_{i=1}^{N_{visb}}|K_{3,i}|[SF_{i,n}UIVE]$$

Where $N_{visb}$ is the number of SVs used in the position solution of the $n^{th}$ user, $K_{3,i}$ is the partial derivative of the vertical position error with respect to the pseudorange error of the $i^{th}$ SV, $UDRE_i$ is the 99.9th percentile of the differential user range error of the $i^{th}$ SV, $\sigma_{user}$ is the standard deviation of the avionics contribution to the pseudorange, and $SF_{i,n}$ is the obliquity factor between the $i^{th}$ SV and the $n^{th}$ user. Assuming Gaussian statistics, the 99.9th percentile of (14) can be converted to a one-sigma (1σ) value, $\sigma_{vpe,n}$, as follows:

$$\sigma_{VPE,n} = \frac{VPE_n}{3.27} \quad (15)$$

The vertical position error of (14) has two interesting properties:
1. Vertical position error depends on a differential user range error that is SV dependent, $$\sum_{i=1}^{N_{visb}}[K_{3,i}^2][UDRE_i]$$

2. Vertical position error depends on the projection of the avionics component of pseudorange onto the user location.

$$\sum_{i=1}^{N_{visb}}[K_{3,i}^2][3.27\,\sigma_{user}^2]$$

Regarding the first property, the one-sigma (1σ) value of differential user range error is defined in (14) as:

$$\sigma_{UDRE,i} = \frac{UDRE_i}{3.27}$$

In the initial discussion of UDRE, (10)–(13), the navigation positional error, $\sigma_{nav,wp}$, was used as the aggregate of the navigation errors from multiple SVs. This aggregation is the result of the projection of the $i^{th}$ SV error, contained in the pseudorange uncertainty matrix, R, onto the user location as shown in (5). To construct a differential user range error that is SV dependent requires extracting each SVs contribution to $\sigma_{nav,wp}$ before the compression. By approximating the pseudorange uncertainty matrix, R, as a diagonal matrix (further analysis indicates that for SV configurations with minimum PDOP this approximation is accurate), and setting the differential user range error, $\sigma_{UDRE,i}$, as follows:

$$R_{i,j} = \sigma^2_{UDRE,i} \cdot \delta_{i,j} \quad (16)$$

where $\delta_{i,j}$ is the Kronecker function, the resulting components of the predicted user position covariance, $C_w$, have the form:

$$C_w(m,m) = dot\sum_{i=1}^{N_{visb}}K_{m,i}^2 R_{i,i} = \sum_{i=1}^{N_{visb}}K_{m,i}^2\sigma_{UDRE,i}^2 \quad (17)$$

for $m = 1, 2, 3$

In other words, the navigational positional error, $\sigma_{nav,wp}$, of (12) becomes:

$$\sigma_{nav,wp} = \sqrt{\sum_{m=1}^{3}\left[\sum_{i=1}^{N_{visb}}K_{m,i}^2\sigma_{UDRE,i}^2\right]} = \sqrt{\left[\sum_{m=1}^{3}C_w(m,m)\right]} \quad (18)$$

and similarly, the horizontal and vertical positional errors, ($\sigma_{nav,wh}, \sigma_{nav,wv}$), are respectively:

$$\sigma_{nav,wh} = \sqrt{\sum_{m=1}^{2}\left[\sum_{i=1}^{N_{visb}}K_{m,i}^2\sigma_{UDRE,i}^2\right]} = \sqrt{\left[\sum_{m=1}^{2}C_w(m,m)\right]} \quad (19)$$

$$\sigma_{nav,wv} = \sqrt{\left[\sum_{i=1}^{N_{visb}}K_{3,i}^2\sigma_{UDRE,i}^2\right]} = \sqrt{C_w(3,3)} \quad (20)$$

As a consequence of (20), the vertical position error dependency on differential user range error has the form:

$$\sum_{i=1}^{N_{visb}}[K_{3,i}^2][UDRE_i] = 3.27\,C_w(3,3) \quad (21)$$

In a similar manner, the avionics component shown in (14) can be equivalently computed using the K-matrix; specifically the (3,3) element of the product matrix [ ] satisfies the following:

$$[3.27\cdot\sigma_{user}^2\cdot(K\cdot K^T)](3,3) = \sum_{i=1}^{N_{visb}}[K_{3,i}^2][3.27\,\sigma_{user}^2] \quad (22)$$

Since the total predicted user position covariance, $C_u$, as defined in (6), is the sum of this product matrix (22), and predicted user position covariance, $C_w$, by combining (21), (22), (14), and (15), we have:

$$\sigma_{VPE,n} = \sqrt{C_u(3,3)} + UIVE_n \quad (23)$$

since $$C_u(m,m) = \sum_{i=1}^{N_{visb}}[K_{m,i}^2][\sigma_{UDRE,i}^2 + \sigma_{user}^2] \quad (24)$$

-continued $$UIVE_n = \sum_{i=1}^{N_{visb}} SF_{i,n} \left[\frac{UIVE}{3.27}\right] |K_{3,i}| \quad (25)$$

Horizontal Position Accuracy (HPA)

The horizontal position accuracy, as defined in [FAA-E-2892], is the 95th percentile of the horizontal position error distribution at specific locations over 24 hours. Again, using the GPS classical interpretation (8), and following the definition of UDRE, the RMS horizontal navigation position error, $\sigma_{nav,p}$, relates to UDRE and HDOP as follows:

$$\sigma_{nav,wp} = HDOP \cdot \sigma_{UDRE} = \sqrt{\sum_{i=1}^{N_{visb}} [K_{1,i}^2 + K_{2,i}^2][\sigma_{UDRE,i}^2]} \quad (26)$$

where the second equality follows from (19). Since the vertical position error (14) includes the avionics component of pseudorange and the residual ionospheric delay, the resulting definition of horizontal position accuracy follows:

$$HPA = 2.0 \cdot \sigma_{HPA,n}(t_k) \quad (27)$$

with a one-sigma (1σ) horizontal position accuracy, $\sigma_{HPA,n}$, of the form:

$$\sigma_{HPA,n}(t_k) = \sqrt{\sum_{i=1}^{N_{visb}} [K_{1,i}^2 + K_{2,i}^2]\left[\sigma_{UDRE,i}^2 + \sigma_{user}^2 + \left(SF_{i,n}\frac{UIVE}{3.27}\right)^2\right]} \quad (28)$$

$$= \sqrt{C_u(1,1) + C_u(2,2) + \sum_{i=1}^{N_{visb}} (K_{1,i}^2 + K_{2,i}^2)UIVE_{i,n}^2}$$

where the second equality follows from (24) and $$UIVE_{i,n} = SF_{i,n} \cdot \left[\frac{UIVE}{3.27}\right] \quad (29)$$

By this interpretation, the horizontal position error is a more conservative metric than the classical GPS metric, having included the RMS component of the residual ionospheric delay.

Vertical Position Accuracy (VPA)

The vertical position accuracy, as defined in [FAA-E-2892], is the 95th percentile of the vertical position error distribution at specific locations over 24 hours. Following the discussion above for the horizontal position accuracy, the definition of the vertical position accuracy follows as:

$$VPA = 2.0 \cdot \sigma_{VPA,n}(t_k) \quad (30)$$

with a one-sigma (1σ) vertical position accuracy, $\sigma_{VPA,n}$, of the form:

$$s_{VPA,n}(t_k) = \sqrt{\sum_{i=1}^{N_{visb}} [K_{3,i}^2]\left[\sigma_{UDRE,i}^2 + \sigma_{user}^2 + \left(SF_{i,n}\frac{UIVE}{3.27}\right)^2\right]} \quad (31)$$

-continued $$\sqrt{C_u(3,3) + \sum_{i=1}^{N_{visb}} [K_{3,i}UIVE_{i,n}]^2}$$

where the second equality follows from (24) and (29).

While the invention has been described in terms of a single preferred embodiment, those skilled in the art will recognize that the invention can be practiced with modification within the spirit and scope of the appended claims

Having thus described our invention, what we claim as new and desire to secure by Letters Patent is as follows:

1. A method for establishing coverage and accuracy of user navigation position calculations using differential correction data from a wide-area differential global positioning system comprised of a plurality of space vehicles and a plurality of ground reference stations, comprising the steps of:

converting known space vehicle position data into earth-centered, earth-fixed coordinates to form a trajectory model;

determining which ground reference stations are capable of observing a set of known space vehicles to form a navigation accuracy model;

projecting the space vehicle ephemeris and clock accuracy from the navigation model onto a user location in earth-centered, earth-fixed coordinates;

iterating the wide-area differential global positioning system calculations over a specified period of time until the desired coverage area has been evaluated; and outputting and storing the calculated coverage and accuracy of user positions for a given wide-area differential global positioning system.

2. The method of claim 1, wherein potential user position inputs comprising latitude, longitude and altitude are converted into earth-centered, earth-fixed coordinates and stored in a database;

inputting the trajectory model and navigation accuracy model into said database for storage along with the user position data;

setting a reference time and calculating new user positions and new space vehicle positions at an incremental time period from the reference time;

estimating short and long term ephemeris and clock errors in both the space vehicle and ground reference station;

predicting the space vehicle clock errors along with a covariance error matrix;

projecting an error matrix of user position to determine coverage and accuracy of user position within a wide-area differential global positioning system.

3. The method of claim 2 wherein a least-squares error covariance is used to predict the space vehicle clock and covariance error matrix.

4. The method of claim 2 wherein the user position and space vehicle position incremental time period is about 5 minutes.

* * * * *